United States Patent Office 3,542,648
Patented Nov. 24, 1970

3,542,648
PRESERVATION OF YEAST
John James Miller, Hamilton, Ontario, Canada, assignor to Canadian Patents and Developments Limited, Ottawa, Ontario, Canada, a corporation of Canada
No Drawing. Filed May 31, 1967, Ser. No. 642,322
Claims priority, application Canada, June 18, 1966, 963,300
Int. Cl. C12c 11/00
U.S. Cl. 195—82    5 Claims

ABSTRACT OF THE DISCLOSURE

Yeast cells are fed with acetic acid under controlled pH in two stages to give improved viability on desiccation and storage. Improved spore production is achieved after acetic acid treatment, followed by adding a nontoxic acid such as sulfuric, hydrochloric or citric acid to a controlled pH.

---

This invention is directed to the preservation of yeast and other spore-forming microbes. More particularly a novel process for the large scale production of yeast spores (and dehydration-resistant yeast cells) is described. Conditioned yeast cells having improved resistance to dehydration (improved viability after dehydration) are a further aspect of the invention.

In nature most yeast organisms alternate between the vegetative (growth) stage and the spore stage. Yeast is believed to overwinter and survive adverse conditions in the spore stage and has been found to be more desiccation-resistant in this stage than cells in the vegetative stage. The baking and alcoholic fermentation industries normally use yeast cells in a compressed cake or in an active dry (vegetative) state. It would be desirable to have stable and reliable supplies of yeast inoculum which could be stored for extended periods. Dehydrated yeast spores would serve this purpose if an economical and reliable method for the large scale production of yeast spores were available.

An object of the present invention is to provide a process for the large scale production of yeast spores suitable for dehydration and storage. A further object is to provide conditioned yeast cells susceptible to dehydration and showing improved viability thereafter (compared to unconditioned cells). It is also an object to require only standard fermentation or yeast culture equipment in the process.

Vegetative cells from growth cultures die within a few days when dried. When spore preparation of selected yeast strains are dried, a considerable proportion of the spores are still alive after 18 months or more and give rise to growth cultures resembling the original growth culture that produced the spores. In U.S. Pat. No. 1,801,095 Levin proposed using "ascospores" to store yeast strains for long periods. However the process described in this patent for obtaining the spores is not suitable for economical large scale production (the heat treatments specified would be expected to kill large numbers of cells and spores). Other investigators have used sodium and potassium acetate to stimulate sporulation of small quantities of yeast with the acetate being added only at the start of sporulation.

In accordance with the present invention, economical large scale production of yeast spores is achieved by growing yeast cells in a suitable growth medium; when growth is complete separating the cells from the growth medium and transferring them to an aqueous solution of about 0.1 to 0.5% acetic acid adjusted to a pH of about 5.5 to 6.5 (e.g. with KOH); aerating the cell suspension and adding further acetic acid to the suspension (as the cells metabolize it) to maintain the pH at about 5 to 6; after about one half or more of the cells have formed spores discontinuing the acetic acid addition and instead adding a nontoxic acid (e.g. sulfuric, hydrochloric) to maintain the pH at about 4 to 5.5; and after about 6 to 12 hours (in the nontoxic acid solution) separating the yeast cells containing spores, and forming a press cake or drying them to a low moisture content.

As a further aspect of the invention it has been found that when the cells have been in the acetic acid sporulation medium for some time (e.g. at least about 10 hours but not long enough to form spores) the "sporulating" cells are more desiccation-resistant than normal vegetative cells. In cultures that have sporulated to their full extent, a portion of the cells do not form spores. In many strains of yeast these non-sporulated cells, like the cells containing spores, have been found not to be killed by drying. These conditioned cells may be dried and a sufficient percentage remain viable for several months.

The percentage of acetic acid present initially may range from about 0.1 to about 0.5% wt./vol. without detrimental decrease in sporulation but about 0.1 to 0.2% wt./vol. is preferred.

Lactic acid has been found to support sporulation on a small scale—however, tests using lactic acid on a larger scale with continued replenishment according to the present invention, were relatively unsuccessful compared to acetic acid.

The pH of the sporulation medium is important and if the pH is below about 5 the efficiency of spore formation drops sharply; and if it is above about 6 bacterial contaminants are encouraged. Nontoxic acids suitable for pH adjustment include sulfuric, hydrochloric and citric acid. Potassium hydroxide is preferred to other alkalis for pH adjustments as tests have shown increased sporulation therewith. Experiments with small-scale cultures have indicated temperatures of 25 to 30° C. to be the most favourable for sporulation.

The strain of yeast should be one that is capable of sporulation. Suitable yeasts include strains from *Saccharomyces cerevisiae* including common baking yeast, and wine strains such as "Bordeaux," "Johannisberg" and "Muscatel." Some strains of distillery or brewing yeast (*S. cerevisiae* and *S. carlsbergensis*) sporulate sufficiently well to make the method applicable. As not all isolates of *S. cerevisiae* (and some other yeasts) sporulate well, it is advisable to screen them using a convenient small scale sporulation method. Duration of spore survival has been found to vary to some extent among yeast strains.

It is desirable to work with as high cell densities as possible (so that the volume of the culture vessels is not unreasonably large). In the present invention it is desirable to use cell densities of about 100 to 250 million or more cells per ml. The prior art sporulation methods would not work at the higher cell densities mainly because there would not be enough of the nutrient present to give much spore production. For example if the acetate concentration is increased above about 1%, spore production is poor because of toxicity. Moreover as the acetate radical of the acetic acid molecule is consumed the pH will rise to a neutral or mildly alkaline level due to the Na+ or K+ remaining (which favours bacterial contamination). The total amount of sodium or potassium added per unit volume of culture, if added at the start of sporulation (as acetate), would be at least 10 times that present according to the process of the present invention.

Yeast cells or spores prepared in this manner keep well in a dry atmosphere e.g. over silica gel. For best results the yeast should be stored under refrigeration, not at room temperature. Genetic drift of species can be prevented or minimized for long periods by this method.

The following examples contain processing details of three experimental runs of the spore production method. Examples 1 to 4 describe procedures common to the three runs, and Examples 5 to 7 give specific information about each run individually. These examples are illustrative only: it is obvious that improved handling methods would be used on a large commercial scale.

EXAMPLE 1

(Growth cultures)

Yeast cells were multiplied in a growth medium containing per 100 ml. distilled water, 5 ml. molasses (Domolco), 0.2 gm. urea, and 0.1 gm. potassium hydrogen phosphate. The latter three ingredients were autoclaved separately as 20%, 20% and 10% aqueous solutions, respectively, and then combined with sufficient autoclaved distilled water in a sterilized 18-litre glass bottle to make either 12 or 15 liters of medium.

The large volume of medium was inoculated by adding two 100 ml. volumes of the same medium (from 500 ml. Erlenmeyer flasks), which had been inoculated from a laboratory yeast nutrient agar slant culture and grown for a day on an Eberbach shaking machine operated at 100 shakes per minute.

The 12 or 15 liter volume of inoculated growth medium was aerated by passage of a stream of air from a compressed air source through a cotton filter and a sparger into the lower levels of the culture. After 25–30 hours the aeration was stopped and the yeast cells were allowed to settle out overnight. The following morning as much as possible of the growth medium was siphoned off without disturbing the deposit of cells.

EXAMPLE 2

(Sporulation cultures)

Sufficient autoclaved distilled water was added to the culture bottle to restore the volume of liquid to what it had been at the beginning of the growth phase. Aeration was resumed. Then sufficient 20% acetic acid, neutralized to pH 6.5 with potassium hydroxide, was added to make a final concentration of 0.1 or 0.2% acid radical in the medium. Alternatively, sufficiently potassium acetate was added to supply the desired concentration of acid radical. The number of yeast cells per ml. in the sporulation culture was determined by diluting one ml. of it to 100 ml. with water, mixing, and examining 2 drops of the dilution under the microscope in a Spencer AO counting chamber.

Usually little or no change in the pH was observed during the first few hours after commencement of a sporulation culture. When consumption of the acid radical by the yeast cells began, as indicated by a rise in the pH, a solution of 10% acetic acid (practical or reagent grade) in distilled water was fed into the culture at a rate sufficient to maintain the pH between 5 and 6. This was continued for 2–3 days.

The acetic acid supply was discontinued when the percentage of yeast cells that contained spores had reached at least 50%. The pH then began to rise steadily, and when it was found to have reached pH 7–8, sufficient 10% w./v. sulfuric acid was added to bring it down to approximately 4.5. Sometimes aeration was continued for several more hours after which a further quantity of sulfuric acid was added to restore the pH to 4.5 again. Usually aeration was discontinued after the first addition of sulfuric acid and the cells were then allowed to settle out overnight. However, in Example 5 they were filtered directly out of the sporulation medium without a settling period.

EXAMPLE 3

(Preparation of powdered yeast with cells from sporulation cultures)

Most of the liquid phase of the sporulation culture was siphoned off without disturbing the deposit of cells. The cells were then separated from the remaining liquid by suction filtration on Whatman No. 50 paper using a large Buchner funnel. The separated cells were washed by several passages of sterilized distilled water through the moist yeast layer under suction. The cake of yeast thus obtained was cut up into small pieces, air-dried under a fan, and passed through a grinder to produce a coarse powder which was weighed and placed in glass jars for storage. In most cases storage was in the presence of silica gel, either at room temperature or in a refrigerator at approximately 8° C.

EXAMPLE 4

(Viability testing method)

Yeast powder (0.1 gm.) was added to 100 ml. of sterilized water in a sterile Waring blendor jar, allowed to soak for five minutes, and then agitated for one minute to ensure that individual yeast cells were separated. By further dilution and the use of a Spencer AO counting chamber, the number of cells per gram of the sample could be estimated. This was commonly in the vicinity of 20 billion cells per gram.

To estimate the number of living cells per gram of sample, 0.1 ml. of an appropriate dilution of the contents of the blendor was added to a petri dish and mixed thoroughly with about 15 ml. of wort agar (Fischer Scientific Co.). A total of five replicate plates was prepared when testing each yeast sample. The petri dishes were incubated for one week at 27° C., and by counting the number of yeast colonies that had developed in each dish the number of viable cells per gram of yeast sample could be calculated approximately. Knowing total cells and viable cells, the percentage viability was then calculated.

EXAMPLE 5

The yeast strain employed was F493, which was isolated in 1949 from packaged Fleischmann bakers' yeast. Duration of growth culture: 30 hours. Volume of growth culture: 15 litres. Rate of aeration of growth culture: 15 litres per minute. Duration of sporulation culture: 54 hours. Volume of sporulation culture: 15 litres. Rate of aeration of sporulation culture: 40 litres per minute. Number of cells per ml. of sporulation culture: 15 million. The results are summarized in Table 1.

TABLE 1

| Hours after commencement of sporulation culture | Grams of acetic acid fed into sporulation culture since commencement | pH of culture | Temperature of culture, ° C. | Percentage of yeast cells that contained spores |
|---|---|---|---|---|
| 0 | | 4.3 | | 0 |
| 0 | (1) | 5.5 | | |
| ½ | 0 | 5.7 | | |
| 1 | 0 | 5.6 | 26 | |
| 3 | 0 | 5.7 | | |
| 4 | 0 | 6.0 | | |
| 4½ | 2 | 5.5 | | |
| 5½ | 6 | 5.5 | | |
| 6 | | 5.7 | | |
| 6½ | 9 | 5.9 | | |
| 8½ | 26 | 5.2 | 23 | |
| 9 | 29 | 5.2 | | |
| 10 | 35 | 5.3 | 24 | 0 |
| 11 | 40 | 5.3 | 25 | |
| 22 | 110 | 4.8 | 23 | |
| 23 | 113 | 4.9 | | |
| 24 | | 4.9 | | |
| 25 | | 5.0 | | |
| 28 | 134 | 5.3 | 22 | 5 |
| 30 | 142 | 5.3 | 24 | 10 |
| 36 | 160 | 5.6 | | 20 |
| 46½ | { 196 <br> 2 196 | 7.6 <br> 4.7 | 27 | 56 |
| 54 | | 6.3 | 23 | 60 |

1 Added 75 ml. of 20% acetic acid which had been neutralized to pH 6.5 with KOH.
2 Plus 4.8 gm. H₂SO₄.

During this run 5 samples (A, B, C, D and E) were taken from the sporulation culture after 0, 5, 10, 22 and 54 hours, respectively. Each sample comprised the cells from a litre of sporulation culture which were collected by filtration, dried, ground and stored over silica gel at room temperature. The average dried weight of the samples was 3.1 gm., but in this run considerably yeast was lost through inefficient filtration. The viability test data given in the accompanying table show that the 54 hours sample, in which 60% of the cells contained spores, had a much higher percentage viability than the cells from the younger sporulation cultures which lacked spores. However, the cells from the 22 hour sample appeared somewhat more viable than the still younger sporulation cultures. It will also be noted that the number of cells per gram of dried yeast decreased during sporulation, which implies that a portion of the acetic acid supplied is assimilated by the cells, increasing their weight.

TABLE 2
[Viability test data]

| Sample | Percent of cells that contain spores | Time of exposure to sporulation culture, hours | Number of cells per gram of sample | Percentage of cells viable after— | | |
|---|---|---|---|---|---|---|
| | | | | 5 wks. | 21 wks. | 90 wks. |
| A | 0 | 0 | $3.5 \times 10^{10}$ | 0 | 0 | 0.1 |
| B | 0 | 5 | $2.9 \times 10^{10}$ | 0 | 0.3 | |
| C | 0 | 10 | $2.6 \times 10^{10}$ | 0.3 | 0.5 | |
| D | 0 | 22 | $2.0 \times 10^{10}$ | 4 | 1.2 | 1.4 |
| E | 60 | 54 | $2.1 \times 10^{10}$ | 26 | 24 | 42 |

The percentage viable after 90 weeks for D and E does not indicate an increase in viability (due to sampling error) but does indicate continued stable viability.

EXAMPLE 6

The yeast strain employed was F493, as in Example 5. Duration of growth culture: 25 hours. Volume of growth culture: 12 litres. Rate of aeration of growth culture: 30 litres per minute. Duration of sporulation culture: 79 hours. Volume of sporulation culture: 12 litres. Rate of aeration of sporulation culture: 80 litres per minute. Number of cells per ml. of sporulation culture: 240 million. The results are summarized in Table 3.

TABLE 3

| Hours after commencement of sporulation culture | Grams of acetic acid fed into sporulation culture since commencement | pH of culture | Temperature of culture, °C. | Percentage of yeast cells that contained spores |
|---|---|---|---|---|
| 0 | | 5.9 | | 0 |
| 0 | (1) | 5.9 | | |
| ¾ | 0 | 6.1 | 23 | |
| 1¼ | 0 | 6.4 | | |
| 1½ | 7 | 5.5 | | |
| 2¼ | 11 | 5.6 | | |
| 3 | 16 | 5.5 | | |
| 5¼ | 40 | | | |
| 6 | | 5.6 | 18 | |
| 10½ | 90 | 5.2 | | 0 |
| 11 | 100 | 5.5 | | |
| 22 | 180 | 5.5 | 15 | 0 |
| 24¼ | 200 | 5.7 | | |
| 25¾ | 210 | 5.3 | 21 | |
| 27¾ | 225 | 5.9 | 22.5 | |
| 30¾ | 258 | 5.2 | 23.5 | (2) |
| 33¾ | 290 | 5.5 | | |
| 46 | 332 | 5.5 | 18.5 | 20 |
| 54¾ | 380 | 5.0 | 23 | |
| 60¾ | 408 | 5.6 | | |
| 72 | 453 | 5.5 | 20 | 52 |
| 79 | { 453 | 7.9 | | |
| | ³ 453 | | | |
| | (³) | 4.5 | | 54 |

¹ Added 120 ml. of 20% acetic acid which had been neutralized to pH 6.5 with KOH.
² Less than 1%.
³ Plus 11.4 gm. H₂SO₄.

The yeast was allowed to settle out overnight, filtered, dried, and ground. The dried weight of yeast recovered was 169 gm. The average number of cells per gram was $2.1 \times 10^{10}$. Part of this was stored at room temperature and part in the refrigerator, in both cases over silica gel. Viability tests, done with the sample stored at room temperature, indicated the following percentages of viable cells. After 2 weeks, 31%; after 8 weeks, 28%; after 8½ weeks, 30%; after 9 weeks, 24%; after 88 weeks, 18%. A test of the sample stored in the refrigerator (for 88 weeks) indicated that 26% of the cells were still viable.

EXAMPLE 7

The yeast strain employed was No. 274 in the catalogue of the Czechoslovak Collection of Micro-Organism Cultures, supplied by the Research Institute for Viticulture and Enology, Bratislava, Czechoslovakia. It is a sherry-type wine yeast. Duration of growth culture: 30 hours. Volume of growth culture: 12 litres. Rate of aeration of growth culture: 30 litres per minute. Duration of sporulation culture: 51 hours. Volume of sporulation culture: 12 litres. Rate of aeration of sporulation culture: 60 litres per minute. Number of cells per ml. of sporulation culture: 230 million. The results are summarized in Table 4.

The aeration was continued with no further addition of acid until 51 hours after commencement of the sporulation culture. The yeast was then allowed to settle out overnight, filtered, dried, and ground. The dried weight of yeast recovered was 116 gm. This was divided into four parts which were stored at room temperature and in the refrigerator, with and without silica gel. A viability test was done after 2 weeks using the sample stored in the refrigerator with silica gel and indicated 93% viable cells.

TABLE 4

| Hours after commencement of sporulation culture | Grams of acetic acid fed into sporulation culture since commencement | pH of culture | Temperature of culture, °C. | Percentage of yeast cells that contained spores |
|---|---|---|---|---|
| 0 | | 5.1 | | 0 |
| 0 | (¹) | 6.1 | | |
| 1½ | 0 | 5.7 | | |
| 2 | 0 | 5.7 | | |
| 3 | 0 | 5.9 | | |
| 4 | 0 | 6.1 | | |
| 5 | 0 | 6.7 | | |
| 5½ | 6 | 5.4 | 21 | |
| 22 | 70 | 7.9 | 16 | |
| 22¼ | 100 | 5.0 | | |
| 27 | 110 | 5.4 | 26 | 1-2 |
| 30 | 124 | 5.5 | 27 | |
| 30½ | 126 | 5.5 | 27 | 30-40 |
| 46 | { 200 | 8.0 | 25 | 74 |
| | ² 200 | 4.7 | | |
| 48 | { 200 | 6.9 | | |
| | ³ 200 | 4.5 | | |

¹ Added 40 gm. potassium acetate.
² Plus 14 gm. H₂SO₄.
³ Plus 3.5 gm. H₂SO₄.

A further test done after 72 weeks on the same 4 samples indicated the following cell viabilities.

Table 5

| Storage method: | Percentage of cells viable after 72 weeks |
|---|---|
| Room temperature, no silica gel | 0 |
| Room temperature, with silica gel | 42 |
| Refrigerator, 8° C., no silica gel | 56 |
| Refrigerator, 8° C., with silica gel | 65 |

The usual plating method for determining viability was unsatisfactory when used with this strain because of a strong tendency of the cells to adhere to one another. The above results were obtained by a direct counting technique in which the cells were observed germinating on a nutrient agar under microscope coverglasses.

EXAMPLE 8

Five other yeast strains of commercial value were treated according to the method of this invention, approximating the procedure described in Example 7. Their survival after 77 to 87 weeks of storage is shown in Table 6.

The following points should be noted regarding these tests. With NCYC 360 and VY 22, the percentage of cells that survived to give rise to colonies was considerably greater than the percentage of cells that produced spores. This is evidence that cells that do not form spores may nevertheless be conditioned by the treatment to survive desiccation. Results with CZ 1 and ATCC 8256 support this conclusion With ATCC 8256, desiccation of the cells by exposure to silica gel increased the percentage survival, and so did low temperature. Best survival was obtained with the combination of silica gel desiccation and low temperature, and this was also noted with strain CZ 274 in Example 7. With strain CZ 1, high survival was obtained with all 4 combinations of temperature and humidity, which probably indicates that the ability of the strain to survive following this method of conditioning is very high, so that a pronounced decline in viability was not yet apparent after 85 weeks.

What I claim is:

1. A process for producing yeast cells or yeast spores having improved resistance to dehydration and improved storage properties comprising dispersing mature vegetative cells or growth in an aqueous solution containing about 0.1 to 0.5% wt./vol. acetic acid adjusted to a pH of about 5.5 to 6.5, aerating the suspension and continually feeding acetic acid to the suspension to maintain the pH at about 4.8 to 6 for at least 10 hours.

2. The process of claim 1 including maintaining yeast cells in the acetic acid suspension for at least about 24 hours and until at least about one-half of the cells have formed spores, and then adding a nontoxic acid to maintain the pH at about 4 to 5.5 for a further 6 to 12 hours.

3. The process of claim 2 including separating spores and spore-containing yeast cells from the medium after the non-toxic acid addition and dehydrating to a low moisture content.

4. The process of claim 1 including dehydrating conditioned yeast cells to a low moisture content after acetic acid; treatment but before (or without) spore formation.

5. The process of claim 1 wherein high yeast cell densities of 100 to 250 million or more cells per ml. are used.

TABLE 6
[Yeast viability tests]

| Yeast strain | Percent spores | Duration of storage, weeks | Conditions of storage | Percent survival |
|---|---|---|---|---|
| NCYC360 (A Seagram Distillers' yeast) | 16 | 77 | Refrigerator (8° C.) silica gel | 26 |
| VY22 (An Ontario wine yeast) | 12 | 88 | Room temp., silica gel | 44 |
| CZ304 (A Johannisberg wine yeast) | 27 | 87 | Refrigerator (8° C.) silica gel | 21 |
| CZ1 (A Bordeaux wine yeast) | 44 | 85 | Room temp. | 66 |
| | | | Room temp., silica gel | 52 |
| | | | Refrigerator (8° C.) | 68 |
| | | | Refrigerator (8° C.) silica gel | 68 |
| ATCC8256 (A Muscatel wine yeast) | 52 | 87 | Room temp. | 11 |
| | | | Room temp., silica gel | 41 |
| | | | Refrigerator (8° C.) | 61 |
| | | | Refrigerator (8° C.) silica gel | 75 |

NOTE:
NCYC—National collection of Yeast Cultures (U.K.).
CZ—Czechoslovak Collection of Micro-organism Cultures.
ATCC—American type Culture Collection.

References Cited

UNITED STATES PATENTS

2,717,837  9/1969  Schultz _____ 99—96

FOREIGN PATENTS

672,491  10/1963  Canada.

OTHER REFERENCES

Cook "The Chemistry and Biology of Yeasts" 106–109, 305–310, Academic Press, New York, N.Y., 1958.

McClary et al., J. Bact., pp. 78, 362, 1960.

Miller, J. J., "Wallerstein Lab. Communications," pp. 79, 267, 1959.

LIONEL M. SHAPIRO, Primary Examiner

U.S. Cl. X.R.
99—96; 195—104